March 3, 1970  J. B. TEMPLETON  3,498,065
METHOD AND APPARATUS FOR BARGE ANCHORING AND STABILIZING
Filed Oct. 30, 1967  4 Sheets-Sheet 1

INVENTOR
John B. Templeton
BY
ATTORNEYS

INVENTOR
John B. Templeton

INVENTOR
John B. Templeton

United States Patent Office 3,498,065
Patented Mar. 3, 1970

3,498,065
METHOD AND APPARATUS FOR BARGE ANCHORING AND STABILIZING
John B. Templeton, 1000 Singleton Blvd., Dallas, Tex. 75212
Filed Oct. 30, 1967, Ser. No. 678,820
Int. Cl. E02b 17/06; B63b 21/00
U.S. Cl. 61—46.5
25 Claims

ABSTRACT OF THE DISCLOSURE

A system and method for anchoring and stabilizing a work barge, such as a pile driver barge, where longitudinally interconnected anchor barges have end units anchored by a spud driven into the water bed through a well in the barge. The work barge is also anchored by one or more spuds and is stabilized by one or more brackets coupling adjacent sides of the anchor barge assembly and the work barge. The work barge is movable along the row of anchor barges to new work positions without moving the anchor barges. The anchor barge assembly also is shiftable relative to the work barge to establish a new line or work locations.

---

This invention relates to method and apparatus for anchoring and stabilizing a barge, and it is an object of the invention to provide a new and improved method and apparatus for anchoring and stabilizing a barge.

It is another object of the invention to provide a method of anchoring and stabilizing a barge including interconnecting a plurality of anchor barges in an elongate row forming an elongate articulated floating anchor assembly structure, anchoring the opposite end anchor barges, anchoring the work barge adjacent the anchor barges, and interlocking adjacent sides of the work barge and the anchor barge assembly at one or more locations for stabilizing the work barge.

It is a further object of the invention to provide apparatus for anchoring and stabilizing a work barge including spud assemblies which are used with both the anchor and the work barges for anchoring them, and one or more locking devices for interlocking the anchor barges and work barge along adjacent sides to stabilize the work barge.

It is a further object of the invention to provide a spud assembly for a barge including a spud having a tubular body member telescopically coupled with a hammer unit having a weight portion and driving and pulling shoulders for driving the spud downwardly and lifting the spud upwardly, and a tower supported over the spud including sheaves for handling lines used in raising and lowering the hammer unit of the spud.

It is still a further object of the invention to provide a coupling device for engaging adjacent sides of adjacent barges including a pivotally supported locking member mounted on one of the barges having a laterally opening mouth portion for receiving a side portion of the adjacent barge.

It is still a further object of the invention to provide a coupling device for coupling barges along adjacent sides including a sleeve member secured vertically along the outside side surface of one barge, a C-shaped member rotatably supported along its back vertical portion through the sleeve with its horizontal upper and lower arm portions positioned above and below the sleeve member defining with the sleeve member a laterally open mouth for receiving a side portion of an adjacent barge, and a handle portion secured to the upper horizontal arm portion of the C-member for rotating the member to couple and uncouple the adjacent barges.

Additional objects and advantages of the invention will be readily apparent from the reading of the following description of a device constructed in accordance with the invention, and reference to the accompanying drawings thereof, wherein:

Figure 1:
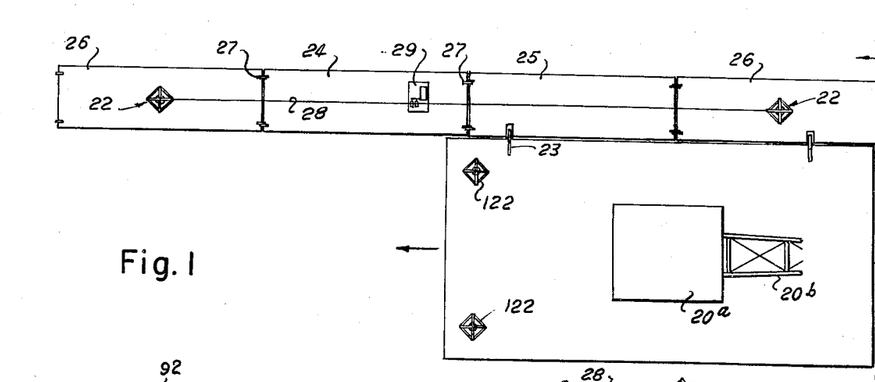
FIGURE 1 is a schematic plan view of one arrangement of a plurality of anchor barges and a work barge anchored and coupled together along one end portion of the anchor barges for stabilizing the work barge in accordance with the invention.

Referring to the drawings, in accordance with the invention, a work barge 20 having a cab 20a and a boom 20b, which may be a conventional type barge as used in pile driving, is positioned alongside an elongate row of anchor barges 21 anchored in a body of water by spud units 22. The work barge is stabilized by one or more coupling devices 23 coupling the work barge with the row of anchor barges at successive positions as the work barge is moved along the anchor barges in a desired direction along a work line driving rows of piles P. The anchor barge assembly includes intermediate barges 24 and 25 and end barges 26 which are interconnected at adjacent ends by suitable conventional hinge members 27 to form an elongated articulated floating assembly or row of barges 21. The end anchor barges and the work barge are each provided with the spud units. The spud units 122 on the work barge may be identical to the units 22 or may be simple drop-type spuds which are not driven but allowed to fall. A winch or hoist 29 on one of the intermediate anchor barges 24 is connected by lines 28 with both of the spud units 22 on the end anchor barges so that both of the units may be operated from the same winch. The winch 29 on the barge 24 also may be provided with a line (not shown) for pulling the work barge relative to the anchor barges for shifting the position of the work barge alongside the anchor barges.

Figures 3, 4, 5, 6, 7, 8:
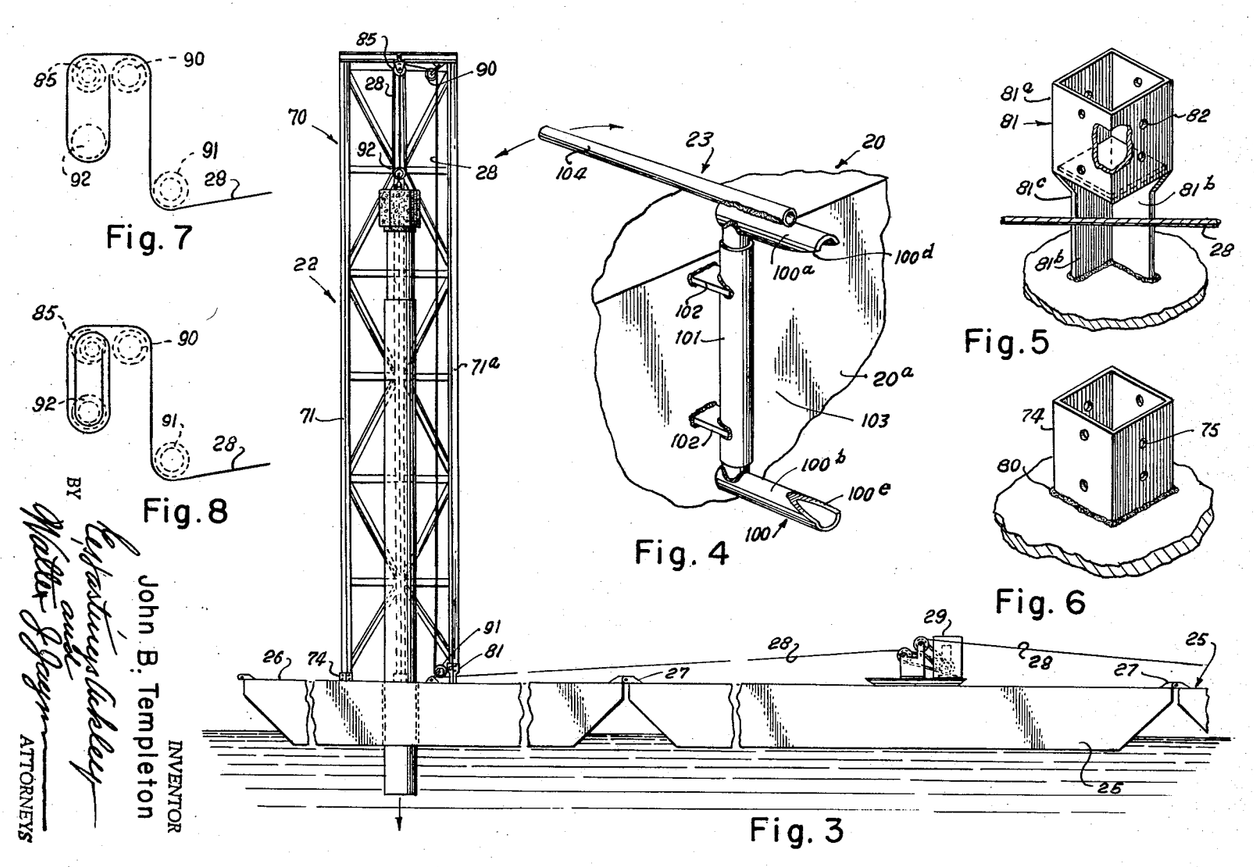
FIGURE 3 is an enlarged fragmentary view in elevation along the line 3—3 of FIGURE 1 showing portions of the anchor barges along with one of the spud assemblies for anchoring the barges and one hoist for operating the spud assembly.
FIGURE 4 is an enlarged fragmentary view in perspective of one of the barge coupling devices mounted on the side of the work barge and rotated to coupling position.
FIGURE 5 is an enlarged fragmentary view in perspective illustrating a socket member for supporting one leg of a tower used in driving and pulling the spuds.
FIGURE 6 is an enlarged view in perspective showing a socket member for supporting the other legs of the spud driving and pulling tower.
FIGURE 7 is an enlarged fragmentary schematic view showing the line arrangement on the pulleys used in the tower when driving a spud downwardly.
FIGURE 8 is an enlarged schematic view similar to FIGURE 7 showing the line arrangement on the pulleys when pulling a spud.
Figure 9:
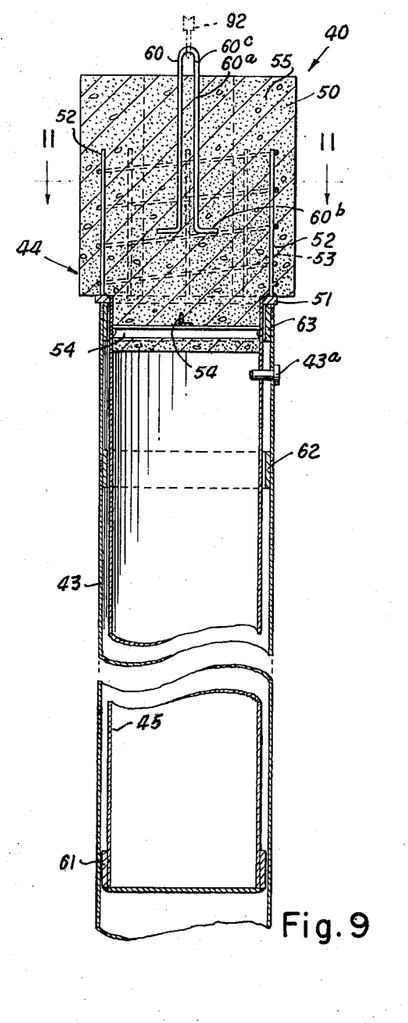
FIGURE 9 is an enlarged fragmentary longitudinal view in section of the upper end portion of one of the spuds showing its telescoping hammer unit for driving and pulling it.

In accordance with the invention, each spud unit includes a spud 40 which is hammered both into and out of the earth forming the water bed. The spud is slidably disposed through a well 42 in the barge on which the unit is mounted, thereby allowing moderate rise and fall of the barge with changes in water level without impairing the anchor feature of the spud. The spud is slidably disposed through a sleeve 41 defining the well 42 extending vertically through the barge, and opening through its top deck and bottom so that the spud is inserted from above the barge and driven downwardly through the barge into the water bed.

Figure 10:
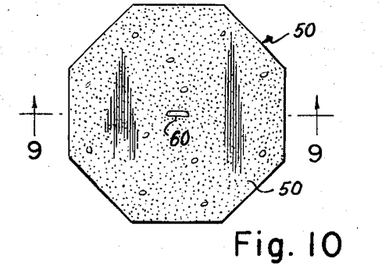
FIGURE 10 is a top view of the spud of FIGURE 9.
Figure 11:
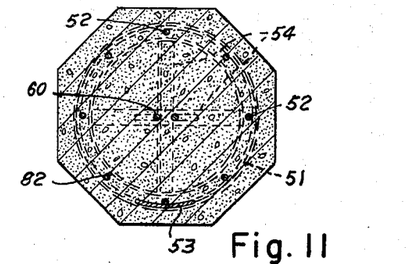
FIGURE 11 is a view in section along the line 11—11 of FIGURE 10 of the weight portion of the hammer unit of the spud.

The spud 40 comprises a tube 43 and a hammer unit 44 telescopically disposed in the upper end portion of the tube. The hammer unit has a sleeve 45 and a head 50 formed of a suitable weighting material such as concrete. The sleeve 45 and the tube 43 are releasably connected by a pin 43a inserted through aligned apertures in the sleeve and tube. A driving ring 41 is suitably secured as by welding around the upper end of the sleeve 45 for securing the head 50 with the sleeve and providing a driving surface for striking the upper end of the tube in driving the spud downwardly. A plurality of vertical, circumferentially spaced, reinforcing rods 52 are welded at their lower ends to the top face of the ring 51 and extend upwardly in the concrete hammer head 50, and a helical reinforcing rod 53 is wound around and welded to the vertical rods 52 encompassing the rods over substantially their entire length. A pair of crossed angle bars 52 disposed perpendicular to each other in the lower end of the concrete hammer head, and each of a length substantially equal to the inside diameter of the sleeve 45, are welded at their opposite ends to the inner surface of the sleeve spaced within the sleeve below its upper end. The body of concrete 55 forming the hammer head thus encloses the rods extending downwardly into the upper end portion of the sleeve 45 around the angle bars 54 to enhance the bond between the concrete head and the sleeve. A bail 60 embedded in the concrete head along its leg and foot portions 60a and 60b, with an upper end portion 60c extending above the head provides means for connection with the cable used for raising and lowering the hammer unit in driving or pulling the spud. An external annular lower pulling shoulder or ring 61 is welded around the lower end portion of the sleeve 45 for engaging an internal annular upper pulling shoulder or ring 62 welded within the tube 43. The pulling ring 61 engages the pulling ring 62 when the hammer head is lifted upwardly for applying an upward hammering blow to the spud tube or sleeve 43 for moving such sleeve upwardly in removing it from the earth of the water bed. An internal annular reinforcing ring 63 is welded within the upper end portion of the tube 43 to reinforce the same and increase the contact area at its upper end for engagement by the hammer unit driving ring 51 when downward blows are applied to the tube in driving the spud into the earth.

The rings 62 and 63 are suitably secured within the tube 43 by providing openings circumferentially spaced around the tube at the desired level or position and spot welding the rings within the tube through such openings. Of course, since the lower hammer ring 61 on the sleeve 45 is below the upper hammer ring 62 within the tube 43, the hammer unit is inserted into the tube prior to spot welding the rings 62 and 63 in place within the tube. The stroke of the hammer unit for hammering the spud both downwardly and upwardly is determined by the distance between the rings 61 and 62 when the sleeve 45 is fully inserted into the tube 43. It will be recognized that the head 50 of the hammer unit may be reduced in size, or that its weight may be increased either by making it of a material such as a heavier metal, or by including heavier metal plates within the concrete when molding the head. For example, the head 50 may be of cast iron suitably secured to the tube 45.

The spud 40 is supported, while being driven or pulled, by a vertical tower 70 mounted on its barge deck. The tower is formed by three posts 71 of equal length and a slightly shorter post 71a disposed in a square configuration, FIGURE 12, interconnected by horizontal members 72 and angle braces 73. As illustrated in FIGURE 1, each of the towers is aligned on its barge such that a diagonal between the post 71a and an opposite post 71 is substantially aligned with the longitudinal axis of the barge. The three legs 71 of the tower are each secured along lower end portions in a box shaped socket 74 by bolts (not shown) inserted through holes 75 in the plates forming the sides of the socket. The socket is suitably secured as by welding at 80 to the deck of the barge. The fourth or shorter post 71a of the tower, nearest the hoist or winch 29, is supported on a modified socket 81 having an elevated upper portion 81a identical to the socket 74 and is provided with holes 82 for bolting the lower end of such shorter post in the socket. The lower portion 81a of the socket 81 is formed by a vertical plate angle member 81b comprising downward extensions of joined side plates of the upper portion of the socket. The plates 81b each have a vertical recess 81c so that the cable 28 from the winch or hoist 29 may pass along the socket beneath the lower end of the tower post 71a, aligned substantially parallel with a diagonal of the post without rubbing against or otherwise contacting the post. Thus, effectively a clearance is provided in the post 71a to allow for the passage of the line from the hoist for operating the spud.

Figure 12:
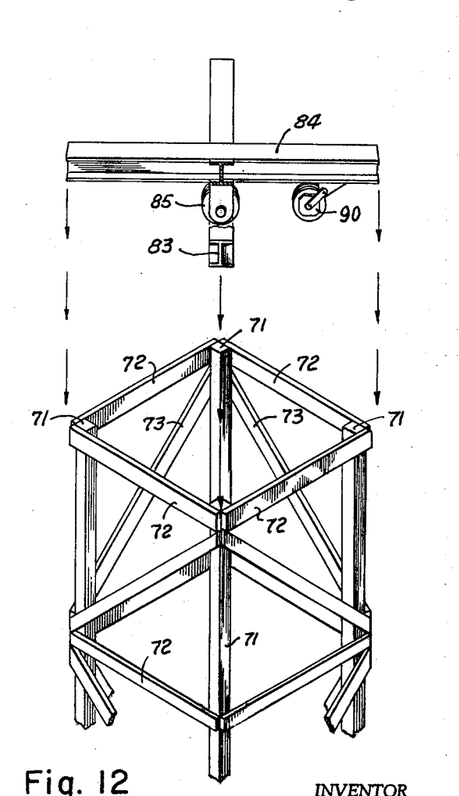
FIGURE 12 is an enlarged broken fragmentary view in perspective of the tower of the spud assembly.

A pair of crossed support members 83 and 84, which may be I beams as illustrated in FIGURE 12, are supported at their ends on the tops of the posts of the tower, forming diagonals of the tower disposed at 90 degree angles with respect to each other. Sheaves 85 and 90 are suspended from the beams 83 and 84, respectively, for movably supporting the cable 28 which extends from the winch 29 through a floor or bottom sheave 91 mounted on the barge deck within the tower and upwardly within the tower to the sheaves 90 and 85. Another sheave 92 is connected with the bail 60 of the hammer unit of the spud and the cable 28 is threaded around the pulley 92 so that the cable supports the spud and raises and lowers the hammer unit to hammer the spud both into and out of the water bed. The cable 28 is arranged on the sheaves, as shown in FIGURE 7, for a mechanical advantage of 2 to 1, which is generally the cable arrangement used in both driving and pulling the spud. Both the driving and the pulling of the spuds are accomplished by hammer action utilizing the substantial weight of the head 50 of the hammer unit rather than relying upon a direct pulling force applied by the cable. An alternate cable arrangement on the sheaves is shown in FIGURE 8 providing a mechanical advantage of 4 to 1 for use in removing the spuds, if desired. Of course, any desired cable arrangement may be used to accomplish the result.

Figure 2:
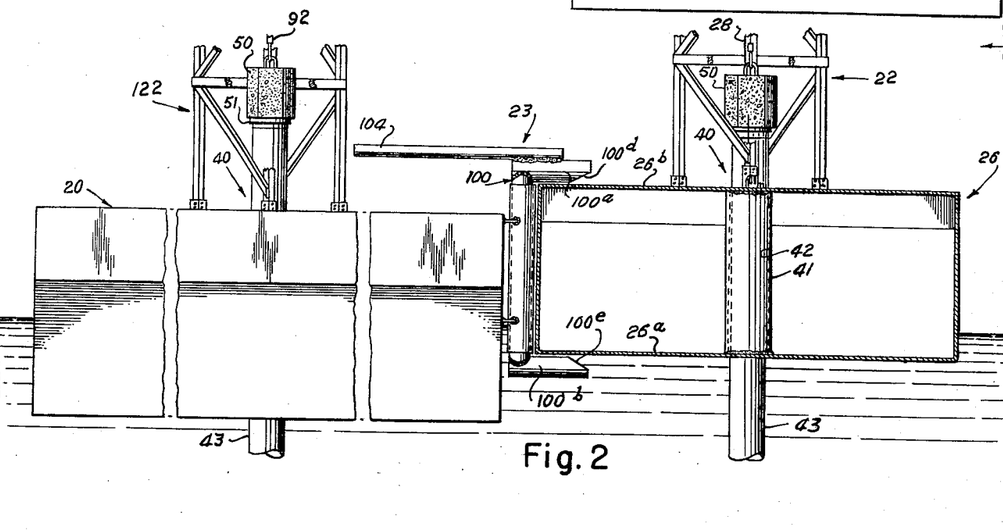
FIGURE 2 is an enlarged fragmentary view in section and elevation along the line 2—2 of FIGURE 1.

One or more of the coupling devices 23 is secured along one side of the work barge 20 for intercoupling the work barge with the anchor barge assembly for limiting vertical relative movement between the work barge and the anchor barge assembly for limiting vertical relative movement between the work barge and the anchor barges to stabilize the work barge. The coupling device includes a substantially C-shaped coupling member 100 having upper and lower arm portions or stop members 100a and 100b, respectively, secured on a vertical shaft portion 100c, which is rotatably disposed through a vertical sleeve 101 secured to parallel spaced horizontal brackets 102 which are suitably fixed, as by welding, to the side 20a of the work barge. The arms and vertical shaft portion of the member 100 and the sleeve 101 define a laterally opening recess 103 which loosely receives a side portion of one of the anchor barges, FIGURE 2. The arm portions 100a and 100b are spaced a greater distance apart than the depth of the barge 26 as measured between its bottom 26a and top deck 26b. The outer ends of the arm portions of the coupling member 100 are each chamfered or beveled at 100d and 100e, respectively, along the inner portions of the arms to define a divergent outward portion of the recess 103 to facilitate guiding the coupling device on the anchor barge so that exact alignment between the work barge and the anchor barge is not required for coupling them together. A handle 104 is secured on the upper arm 100a of the C-shaped coupling member extending over and substantially parallel to the deck of the work barge for swinging the coupling member between its coupling or engaged position, as shown in FIGURE 2, and an unlocked position, not shown, in which the locking device is rotated by the handle to a position at which the arms 100a and 100b are substantially parallel with the side of the work barge.

A first step in anchoring and stabilizing the work barge, in accordance with the invention, is the positioning and anchoring of the anchor barges. The anchor barges are either towed individually to the location of use where they are assembled longitudinally end to end to form the articulated elongate assembly 21, or the barges are assembled and then towed as a unit to the desired location. The barge assembly includes the two end barges 26 each having a spud unit 22 and at least one or more, preferably at least two inner barges 24 and 25, one of the inner barges being provided with the hoist 29. During transit, the spud units 40 are held at an upper position as shown in FIGURE 3 to reduce the draft of the barges, particularly when they are being moved in relatively shallow water. A bolt or pin 43a may be inserted through suitable matching apertures in the outer tube 43 and the inner sleeve 45 for holding the outer tube retracted against movement to extended position. After the barges are interconnected the cables 28 from the hoist 29 are rigged with each of the spud units on the end barges by extending the cables from the hoist along the barge decks through the sheaves 85, 90, 91, and 92 for supporting the spuds and raising and lowering the hammer units. One cable 28 extends from the hoist to the spud unit on one end barge while another cable 28 extends to the spud unit on the other end barge thereby allowing one hoist to operate both of the spud units. When the anchor barges are transported assembled as in FIGURE 1, the spuds are lifted and held by their cables 28 at an upper position during transit. If the barges are moved to locations individually, the telescoped spuds on the end barges are raised to the upper retracted position and supported at such position in any suitable manner such as suspending the hammer from a cable which is then tied in any suitable manner at the base of the tower to support the spud at the upper position until the barge is on location and the spud is connected with the hoist by the cable 28.

Once the anchor barges are at the desired location and assembled, the spuds on the end barges are driven downwardly to firmly anchor the barge assembly. Each of the spuds is driven by repeatedly lifting the hammer unit 44 to its upper end position by means of cable 28 and releasing it to fall. The hammer unit is raised until its ring 61 is just below the ring 62 within the outer tube 43, and is released to fall downwardly until the driving ring 51 strikes the upper end of the tube applying a substantial downward force to the tube due to the weight of the hammer head 50. The hammer head is repeatedly raised and allowed to fall until the spud tube has been driven to the desired depth for anchoring the barge. After the spuds on the end barges have been driven, the anchor barge assembly 21 is held against horizontal movement in the water by the spuds, while the sliding relationship of each of the spuds through its sleeve 41 permits a limited amount of change in elevation of the barge assembly with respect to the spuds due to the rise and fall of the water in which it is floating.

When the anchoring of the anchor barge assembly 21 is completed, the work barge 20 is towed to a position alongside the anchor barges with the side of the work barge on which the coupling devices 23 are secured being moved toward the anchor barges until the sleeves 101 of the locking devices are substantially engaging the adjacent sides of the anchor barges. The work barge is preferably initially aligned alongside one end portion of the anchor barge assembly, FIGURE 1, so that the work barge is moved along the length of the anchor barge assembly as the piles P are driven. While the work barge is moving between positions alongside the anchor barges, the coupling devices 23 are preferably uncoupled with their handles 104 aligned substantially parallel with the edge of the work barge to avoid damage to the arms 100a and 100b of the coupling members 100 as a result of movement of the anchor barge with respect to the work barge because the barges are not at the correct elevations for coupling by the devices. When the work barge is positioned at each new location along the anchor barges, the drafts of the barges are adjusted, if they are not already floating at the proper elevation in the water, to align the barges for coupling the devices 23. Adjustment of the draft of the barges is accomplished in any suitable conventional manner such as by use of ballasting tanks. The coupling devices 23 are then rotated by means of the handles 104 until the arms 100a and 100b are substantially perpendicular to the side of the work barge with a portion of the adjacent anchor barge being disposed in the lateral recess 103 of each locking device, the arms 100a and 100b extending over the deck and bottom, respectively, of the anchor barge. There is a fairly loose engagement between the coupling devices 23 and the anchor barges which permits the work barge and the anchor barges to move toward and away from each other to a limited extent while the locking devices remain in coupled relationship and yet limit the relative vertical movement of the barges with respect to each other. At each position of the work barge the work and anchor barges may be suitably lashed together with cables to further minimize relative lateral movement of the barges. Under some circumstances the combined effect of the spuds and coupling devices may provide a suitable lashing function.

The work barge carries two spud units 122 each having a spud which is driven downwardly by using means such as the hoist 29 or is simply dropped into the water bed when the work barge is properly positioned alongside the anchor barges. Preferably, the work barge and anchor barges are coupled with the coupling devices 23 prior to driving the work barge spuds so that the spuds enter the bed at the proper angle with the work barge substantially level.

The spuds of the anchor barges together with the spuds of the work barge in combination with the coupling of the adjacent sides of the barges by the coupling devices 23 on the work barge stabilize the work barge against rolling and pitching movement and particularly against tilting by shifting loads on the work barge, while permitting minimum rise and fall of the work and anchor barges with changes in water level. The spuds and coupling devices especially minimize lateral tilting and movement of the work barge. The stabilizing of the work barge is advantageous when the barge is used for driving piles at angles, as shown in my co-pending application entitled Boom and Boom Bracing, File 1540. The combination of the coupling devices and the spuds sufficiently stabilizes the work barge against tilting that the piles may be driven at angles into the water bed from the barge without any appreciable effect on the attitude of the barge from the load or the reaction forces resulting from the driving of the piles.

Figure 1A:
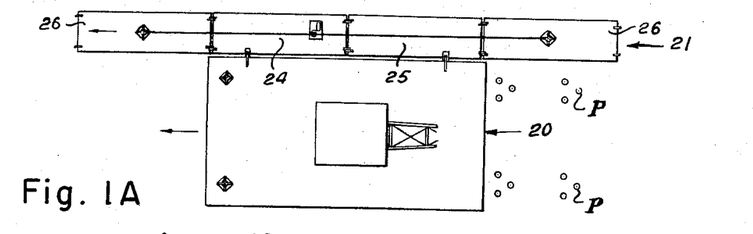
FIGURE 1A is a view similar to FIGURE 1 illustrating the work barge moved to an intermediate position along the anchor barges.
Figure 1B:
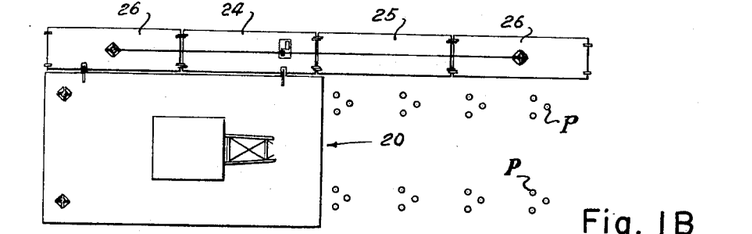
FIGURE 1B is a view similar to FIGURE 1 illustrating the work barge further moved to a position along the other end portion of the anchor barges.
Figure 1C:
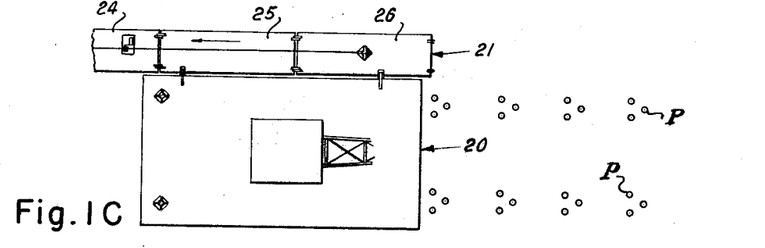
FIGURE 1C is a view similar to FIGURE 1 showing the anchor barges shifted to a new position along a work line for starting a new series of work barge moves along the anchor barges.

The work barge is movable longitudinally alongside the interconnected anchor barges by pulling the spuds of the work barge upwardly until the spuds are released from the water bed, and then towing the barge by means of a cable (not shown) extending from the winch 29 on the anchor barge 24. Each spud on the work barge may be lifted by hammering it upwardly with its hammer unit 44. Utilizing either the cable arrangement of FIGURE 7 or 8 the hammer unit is lifted upwardly repeatedly at a sufficient rate by means of a cable 128 to deliver a series of upward impact blows to the spud tube 43 when the pulling ring 61 on the sleeve 45 of the hammer unit engages the pulling ring 62 within the spud tube. The work barge is then pulled longitudinally relative to the anchor barges until relocated at the desired position, and the work barge spuds are again hammered or dropped downwardly into the water bed. While the loose connection between the locking devices 23 and the anchor barges may permit movement of the work barge relative to the anchor barges, it is generally preferred that the locking devices 23 be disengaged from the anchor barges and re-engaged each time the work barge is relocated alongside the anchor barges. FIGURES 1A and 1B show the work barge advanced to intermediate and end positions, respectively, as piles P are driven along desired lines. The progressive movement of the work barge along the anchor barges as represented in FIGURES 1–1B is often necessary for driving lines of piles as in the construction of a bridge, a causeway, a wharf, or the like. When the desired lines of piles P are to extend a distance requiring more than one length of the anchor barges, the anchor barge assembly is preferably relocated along the work line as in FIGURE 1C to allow the work barge to continue advancing. With the work barge anchored by its spuds, the spuds holding the anchor barges are raised, the anchor barge assembly is moved relative to the work barge from its location in FIGURE 1B to the location of FIGURE 1C, and the anchor barges are again anchored with their spuds at the position of FIGURE 1C. The work barge then begins another phase of sequential movement along the string of anchor barges.

Figure 1D:
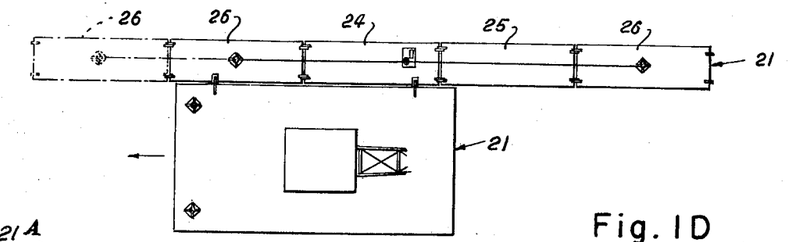
FIGURE 1D is a view similar to FIGURE 1 showing an alternate method of manipulating the anchor barges to effect their extension along a work line by progressive addition of single anchor barges.

One alternative method of moving the anchor barges along a work line to accommodate an advancing work barge is illustrated in FIGURE 1D. In this method of barge manipulation the anchor barge line is advanced by progressively adding individual anchor barges one at a time to the existing line of anchor barges. Obviously in this method, in order to provide for the anchoring of each added barge it is necessary that the added anchor barges each be an end barge 26 provided with a spud assembly. The spud assembly may, of course, be operated from the existing winch 29 mounted on one of the intermediate anchor barges in the existing assembly. As each anchor barge is added it is connected by the hinges 27 to the adjacent end of the string of previously anchored barges. This particular method would generally be used only when extra individual anchor barges are readily available and the line of piles P to be driven is to extend only a short distance beyond the distance which is driven from one assembly of anchor barges.

Figure 1E:
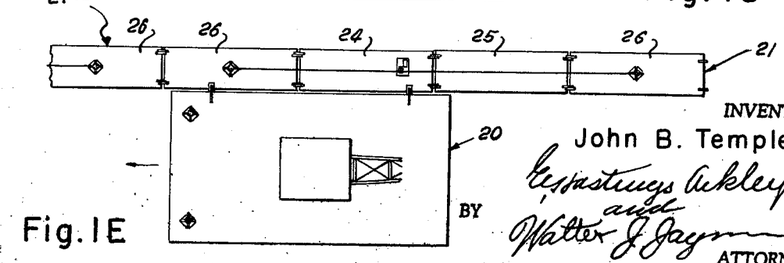
FIGURE 1E is a view similar to FIGURE 1 showing a still further method of handling the work and anchor barges illustrating a second complete set of coupled anchor barges being positioned along the work line to allow the work barge to continue progression along the work line while the first set of anchor barges is released and relocated.

A still further method of manipulation of the anchor and work barges is represented in FIGURE 1E wherein at least two complete sets of anchor barge assemblies are available. The work barge is progressively moved along the length of the first anchor barge assembly 21 as shown in FIGURES 1–1B. Then, to accommodate the further advancement of the work barge a second anchor barge assembly 21A is moved into position along the work line, anchored in place, and coupled to the assembly 21, following which the work barge is advanced along the interconnected anchor barge assemblies until it is at a location at which it is fully coupled with the assembly 21A at which time the first anchor barge assembly 21 is released and relocated as desired to continue the line of piles being driven.

While spud units 22 are shown only on the end anchor barges, it will be recognized that the inner anchor barges 24 and 25 may also be equipped with spuds if operating conditions indicate the desirability of additional lateral stability or anchoring. While the use of the single winch or hoist 29 on one of the inner anchor barges reduces equipment requirements, it will also be recognized that additional winches may be used on the other anchor barges. Two coupling devices 23 have been illustrated and described for coupling the work barge with the anchor barges, though more or fewer coupling devices may be used if conditions necessitate. The use of the two coupling devices spaced as shown in FIGURE 1 provides substantial stability both transversely and longitudinally though a single coupling device will often stabilize the work barge adequately.

It will now be seen that new and improved methods and apparatus for anchoring and stabilizing a work barge has been described and illustrated.

It will also be seen that the method includes anchoring barge means with spud means driven therethrough into the water bed below, anchoring a work barge alongside the anchor barge means by means of spud means and intercoupling adjacent sides of the work barge and the anchor barge means.

It will further be seen that the anchor barge means may comprise a plurality of anchor barges oriented end-to-end to form an elongate articulated anchor barge assembly the end barges of which are anchored by spud means supported thereon.

It will be further seen that a new and improved method of driving and pulling spuds has been described and illustrated wherein a slidable hammer unit telescopically coupled in an upper end portion of the spud is raised and lowered by a cable extending from a hoist for hammering the spud both downwardly and upwardly.

It will be also seen that the apparatus for anchoring and stabilizing work barge includes spud assemblies on both the work barge and the adjacent anchor barges, and one or more coupling devices for loosely coupling the adjacent sides of the work barge and anchor barges to hold the work barge against relative lateral tilting and movement.

It will be seen that one form of coupling device for coupling adjacent barge side portions comprises a bracket pivotally mounted along a vertical axis and having a laterally opening recess for receiving a side portion of the adjacent barge.

The foregoing description of the invention is explanatory only, and changes in the details of the construction illustrated may be made by those skilled in the art, within the scope of the appended claims, without departing from the spirit of the invention.

What is claimed and desired to be secured by Letters Patent is:

1. Apparatus for anchoring and stabilizing a work barge to hold said barge at a fixed location in a body of water and to limit lateral tilting and movement of said barge comprising: an anchor barge; means associated with said anchor barge for holding said barge at a fixed location in said water; a work barge; and coupling means on one of said barges having a laterally opening recess for loosely receiving a side portion of the adjacent barge, said recess being defined between stop members for engaging the deck and bottom of said adjacent barge for intercoupling adjacent sides of said work barge and said anchor barge when said work barge is alongside said anchor barge to limit vertical movement of said work barge, said coupling means permitting longitudinal movement of said work barge and said anchor barge relative to each other along their adjacent sides on the surface of the body of water while said barges are intercoupled by said coupling means.

2. Apparatus for anchoring and stabilizing a work barge as defined in claim 1 including means associated with said work barge for holding said work barge at a fixed location in said water with respect to said anchor barge.

3. Apparatus for anchoring and stabilizing a work barge as defined in claim 1, including: a plurality of anchor barges coupled together in end-to-end aligned relationship forming an elongate anchor barge assembly, and wherein said work barge is movable along the sides of said plurality of anchor barges on the surface of the body of water longitudinally of said plurality of anchor barges.

4. Apparatus for anchoring and stabilizing a work barge as defined in claim 1, wherein said coupling means is secured on a side of said work barge.

5. Apparatus for anchoring and stabilizing a work barge as defined in claim 1, wherein said coupling means comprises: a sleeve secured vetrically along one side of one of said barges; a C-shaped member having a vertical portion rotatably disposed through said sleeve and upper and lower horizontal portions above and below said sleeve forming upper and lower stop members for engaging the deck and bottom of an adjacent barge, and handle means secured on said upper portion for rotating said C-shaped member between engaging and disengaging relation with said adjacent barge.

6. Apparatus for anchoring and stabilizing a work barge as defined in claim 3, including: a spud unit on at least two of said anchor barges for coupling each of said barges with a water bed therebelow to hold said elongate anchor barges at a fixed location in said body of water.

7. Apparatus for anchoring and stabilizing a work barge as defined in claim 6, including: a spud unit on said work barge for coupling said barge with the water bed below said barge to hold said barge at a fixed location in said water.

8. Apparatus for anchoring and stabilizing a work barge as defined in claim 7 wherein said spud unit includes: well means extending vertically through said barge; a spud comprising a main body portion slidably disposed through said well means; and hammer means telescopically coupled with an upper end portion of said main body portion movable relative to said body between upper and lower end positions for applying oppositely directed forces to said spud main body in a desired direction at said end positions whereby said spud is hammered downwardly or upwardly by sequential movement of said hammer means relative to said spud body applying a series of impact blows to said body for moving said spud body downwardly or upwardly.

9. A method of anchoring and stabilizing a work barge to hold said barge at a fixed location in a body of water and to limit lateral and tilting movement of said barge, comprising: positioning an anchor barge at a predetermined location in a body of water; anchoring said anchor barge to hold said anchor barge at said location; positioning a work barge alongside said anchor barge; and slidably coupling adjacent side portions of said work barge and said anchor barge to limit relative vertical and lateral movement between said work barge and said anchor barge and to permit longitudinal movement of said work barge and said anchor barge relative to each other along their adjacent sides on the surface of said body of water while coupled to position said work barge at desired work points spaced longitudinally along the sides of said anchor barge.

10. A method of anchoring and stabilizing a work barge as defined in claim 9 including: anchoring said work barge to the bed of said body of water at said work points alongside said anchor barge.

11. A method of anchoring and stabilizing a work barge as defined in claim 9, including: positioning a plurality of anchor barges in end-to-end relationship and hinged together at adjacent ends forming an elongate articulated anchor barge assembly.

12. A method of anchoring and stabilizing a work barge as defined in claim 11 including: sequentially moving said work barge along the surface of the body of water to a plurality of positions alongside said anchor barge assembly, while said anchor barge assembly and said work barge are coupled whereby said work barge is adapted to discharge work functions while slidably coupled to said anchor barge assembly at a plurality of locations along the length of said anchor barge assembly.

13. A method of anchoring and stabilizing a work barge as defined in claim 11 including: extending said anchor barge assembly along a desired longitudinal direction by sequential steps each comprising adding an anchor barge to said assembly at one end in said desired direction providing a new end anchor barge in said direction of said extension with the addition of each anchor barge; and sequentially positioning said work barge at a plurality of locations alongside said anchor barge assembly by moving said work barge along said anchor barge assembly as said assembly is progressively extended in said desired direction, whereby said work barge is progressively located at a plurality of positions along a progressively extending line to perform work functions along said line, said work barge being held against lateral tilting and movement at each said position by said coupling of said adjacent side portions of said work barge and said anchor barges.

14. A method of anchoring and stabilizing a work barge as defined in claim 11, including: anchoring the opposite end barges of said articulated anchor barge assembly.

15. A method of anchoring and stabilizing a work barge as defined in claim 10, wherein said barges are each anchored by spuds supported thereon inserted into the water bed below said body of water for holding said barges on location in said body of water while permitting limited vertical movement of said barges relative to said spuds.

16. A method of anchoring and stabilizing a work barge as defined in claim 9, wherein said anchor barge and said work barge are coupled along adjacent sides by shifting swingable bracket means supported on one of said barges to a position whereby a portion of the other of said barges is received within said bracket means with upper and lower stop means of said bracket means engaging the deck and bottom, respectively, of said portion of said barge for limiting relative vertical movement of adjacent sides of said coupled adjacent barges.

17. A coupling device for coupling side portions of adjacent barges for limiting vertical displacement of one of said barges relative to the other comprising: sleeve means secured in a substantially vertical position along a side of one of said barges; bracket coupling means swingably supported by said sleeve means including a central vertical member disposed through said sleeve means, and upper and lower substantially horizontal stop members defining with said sleeve means and said central member a laterally opening recess adapted to receive a portion of an adjacent barge, said upper and lower stop members engaging the deck and bottom of said adjacent barge for limiting the vertical movement of said barges relative to each other; and handle means secured to said swingable bracket coupling means for moving said bracket coupling means between locked and unlocked positions.

18. A barge having a coupling device of the character set forth in claim 17 and a spud unit for anchoring said barge at a desired position in a body of water comprising: an elongate tubular spud member adapted to be driven into and retrieved from an earth structure below said water, said tubular spud member having driving and pulling ring means spaced longitudinally thereof; hammer means including an inner sleeve member telescopically disposed in said tubular spud member for movement within said spud member, and a head member secured to said sleeve member providing weight for said hammer means; said inner sleeve member of said hammer means having a retainer and pulling shoulder secured thereon and disposed within said tubular spud member for engaging said pulling ring means for hammering said spud unit upwardly; said head member of said hammer means engaging the upper end of said tubular spud member when hammering said tubular spud member downwardly; and means for supporting said spud unit and raising and lowering said hammer means.

19. A method of anchoring and stabilizing a work barge as defined in claim 11 including sequentially positioning said elongate anchor barge assembly long a predetermined work line along the surface of the body of water at a plurality of locations while slidably coupled with said work barge and moving said work barge along the surface of said body of water alongside said anchor barge assembly at each location of said anchor barge assembly to a plurality of work locations along said work line, the anchoring of said anchor barge assembly being released prior to each movement of said anchor assembly between positions and reanchored at each new location of said assembly, and said work barge being anchored during such movement of said anchor barge assembly between each of its locations.

20. A method of anchoring and stabilizing a work barge as defined in claim 12 including moving said anchor barge assembly longitudinally along the surface of said body of water beside said work barge while said work barge is anchored after said work barge has been moved along said anchor barge assembly through said plurality of positions whereby said anchor barge assembly is advanced along a work line to a plurality of locations and said work barge is moved alongside said anchor barge assembly through a series of work positions along said work line at each of said locations of said anchor barge assembly, such movement of said barges relative to each other along the surface of the body of water being effected while said barges are slidably intercoupled.

21. A method of anchoring and stabilizing a work barge as defined in claim 20 wherein cable means interconnected between said work barge and said anchor barge assembly moves said work barge and said anchor barge assembly relative to each other.

22. Apparatus for anchoring and stabilizing a work barge as defined in claim 2 including lashing means interconnecting said anchor barge and said work barge.

23. A method of anchoring and stabilizing a work barge as defined in claim 9 including lashing said work barge and said anchor barge together along adjacent side portions.

24. A method of anchoring and stabilizing a work barge to hold said barge at a plurality of fixed locations along a work line in a body of water and to limit lateral tilting and movement of said barge, comprising; positioning an anchor barge assembly at a plurality of locations along said work line, said assembly comprising a plurality of anchor barges hinged together at adjacent ends in end-to-end relationship forming an elongate anchor barge assembly; anchoring said anchor barge assembly at each of said locations to hold said assembly at each of said locations; moving said work barge alonside said anchor barge assembly to a plurality of locations at each of said locations of said anchor barge assembly along said work line; coupling adjacent side portions of said work barge and anchor barges at each end of said locations of said work barge to limit relative movement between said work barge work barge at each of said locations along said anchor barge assembly; releasing the anchoring of said anchor barge assembly prior to each movement of said assembly between positions along said work line and re-anchoring said assembly after each movement between said locations along said work line; and holding said work barge anchored during movement of said anchor barge assembly along said work barge between each of the said locations of said anchor barge assembly along said work line.

25. A method of anchoring and stabilizing a work barge to hold said barge at a plurality of fixed locations along a predetermined work line in a body of water and to limit lateral tilting and movement of said barge, comprising; positioning a first anchor barge assembly at a predetermined location along said work line in said body of water, said assembly comprising a plurality of anchor barges hinged together at adjacent ends in end-to-end relationship forming an elongate anchor barge assembly; anchoring said first anchor barge assembly at said location; moving said work barge alongside said anchor barge assembly to a plurality of locations along said work line along the length of said anchor barge assembly; at each of said locations of said work barge coupling adjacent side portions of said work barge and said anchor barges to limit relative movement therebetween, anchoring said work barge at each of said locations; positioning a second elongate anchor barge assembly in alignment with an coupled to said first anchor barge assembly along said work line; anchoring said second work barge assembly; moving said work barge from alongside said first anchor barge assembly to a plurality of positions along said second anchor barge assembly; anchoring said work barge at each of said positions along said second anchor barge assembly and coupling adjacent side portions of said work barge and the anchor barges included in said anchor barge assembly to limit relative movement between said work barge and said anchor barges; said first and second anchor barge assemblies being alternately relocated along said work line and said work barge being progressively advanced along each of said anchor barge assemblies until said work line has been advanced a desired distance in a desired direction.

References Cited

UNITED STATES PATENTS

| 3,001,593 | 9/1961 | Suderow | 61—46.5 X |
| 3,009,326 | 11/1961 | Williams | 61—48 |
| RE24,346 | 8/1957 | Dawson | 61—46.5 |
| 2,931,184 | 4/1960 | D'Arcangelo | 61—46.5 |
| 3,383,870 | 5/1968 | Costello | 61—46.5 X |

FOREIGN PATENTS

| 598,805 | 2/1948 | Great Britain. |

JACOB SHAPIRO, Primary Examiner

U.S. Cl. X.R.

37—73; 61—48; 114—230

PO-1050
(5/69)

UNITED STATES PATENT OFFICE
CERTIFICATE OF CORRECTION

Patent No. 3,498,065           Dated March 3, 1970

Inventor(s) John B. Templeton

It is certified that error appears in the above-identified patent and that said Letters Patent are hereby corrected as shown below:

Claim 5, line 3, for "vetrically" read --vertically--
Claim 6, line 5, after "elongate" insert --assembly of--
Claim 24, line 5, cancel "alonside" and insert --alongside--
Claim 24, line 9, after "each" omit "end"
Claim 24, line 11, before "work" insert --and said anchor barges coupled thereto; anchoring said--
Claim 25, line 38, cancel "an" and insert --and--
Claim 25, line 46, after "said" insert --second--

SIGNED AND
SEALED
AUG 18 1970

(SEAL)
Attest:

Edward M. Fletcher, Jr.
Attesting Officer

WILLIAM E. SCHUYLER, JR.
Commissioner of Patents